US011726800B2

(12) United States Patent
Stockert et al.

(10) Patent No.: US 11,726,800 B2
(45) Date of Patent: Aug. 15, 2023

(54) REMOTE COMPONENT LOADER

(71) Applicant: Citrix Systems, Inc., Fort Lauderdale, FL (US)

(72) Inventors: Trevor Stockert, Fort Lauderdale, FL (US); Scott Israel, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 126 days.

(21) Appl. No.: 17/320,492

(22) Filed: May 14, 2021

(65) Prior Publication Data

US 2021/0271493 A1 Sep. 2, 2021

Related U.S. Application Data

(62) Division of application No. 15/846,749, filed on Dec. 19, 2017, now Pat. No. 11,036,522.

(51) Int. Cl.
*G06F 9/445* (2018.01)
*G06F 8/60* (2018.01)
*G06F 8/71* (2018.01)

(52) U.S. Cl.
CPC ............ *G06F 9/44526* (2013.01); *G06F 8/60* (2013.01); *G06F 8/71* (2013.01)

(58) Field of Classification Search
CPC ........... G06F 9/44526; G06F 8/60; G06F 8/71
USPC .................................................. 717/177
See application file for complete search history.

(56) References Cited

U.S. PATENT DOCUMENTS

| 7,269,717 | B2 | 9/2007 | Tremblay et al. |
| 10,083,030 | B1* | 9/2018 | Fant, IV .................. G06F 8/61 |
| 10,635,728 | B2* | 4/2020 | Gonzalez del Solar ..................... H04L 67/535 |
| 10,684,839 | B2 | 6/2020 | Shuster et al. |
| 11,625,231 | B2* | 4/2023 | Padubidri ................. G06F 8/71 717/170 |
| 2002/0083065 | A1 | 6/2002 | Sasaki et al. |
| 2004/0003390 | A1 | 1/2004 | Canter et al. |
| 2004/0168152 | A1 | 8/2004 | Kramer |
| 2006/0168217 | A1 | 7/2006 | Anand |
| 2006/0200799 | A1 | 9/2006 | Wills et al. |

(Continued)

OTHER PUBLICATIONS

Title: Dynamic placement for clustered web applications, author: A Karveet al, published o 2006.*

(Continued)

*Primary Examiner* — Chameli Das

(57) ABSTRACT

Methods, systems, computer-readable media, and apparatuses may provide for the creation and management of applications with dependencies. An application executing via a client application on a computing device may require a dependency, such as a software module, that is unavailable at the computing device. The application may be compiled with a remote loader module. Based on determining the dependency is unavailable at the computing device, the remote loader module may send information about the dependency to a server, which may provide instructions for retrieving the dependency. The application may then, via the remote loader and based on the instructions, request the dependency. The server may locate the dependency or generate it based on capabilities of the computing device and send the dependency to the application. The application may execute with the received dependency.

17 Claims, 3 Drawing Sheets

(56) References Cited

U.S. PATENT DOCUMENTS

| | | | |
|---|---|---|---|
| 2009/0070764 A1* | 3/2009 | Guizar | G06F 9/544 |
| | | | 718/102 |
| 2009/0133014 A1* | 5/2009 | Laurila | G06F 8/60 |
| | | | 717/174 |
| 2010/0318958 A1 | 12/2010 | Kuester et al. | |
| 2011/0261049 A1* | 10/2011 | Cardno | G06Q 40/04 |
| | | | 345/419 |
| 2012/0047029 A1 | 2/2012 | Veres et al. | |
| 2013/0167105 A1* | 6/2013 | Goldman | G06F 8/60 |
| | | | 717/177 |
| 2014/0013300 A1 | 1/2014 | Shavlik et al. | |
| 2016/0048582 A1 | 2/2016 | Menendez | |
| 2016/0094483 A1* | 3/2016 | Johnston | H04L 47/827 |
| | | | 709/226 |
| 2016/0173640 A1 | 6/2016 | Bhat et al. | |
| 2017/0180346 A1 | 6/2017 | Suarez et al. | |
| 2017/0357492 A1 | 12/2017 | Adler et al. | |
| 2018/0197154 A1* | 7/2018 | Asell | G06Q 10/20 |
| 2019/0188010 A1* | 6/2019 | Stockert | G06F 8/75 |
| 2019/0205105 A1* | 7/2019 | Jensen | G06F 8/71 |
| 2020/0162575 A1 | 5/2020 | Ionescu et al. | |

OTHER PUBLICATIONS

Title: Modeling interactions and navigation in web applications, author: N Güell, et al, published on 2000.*
Title: Cacheflow: Dependency-aware rule-caching for software-defined networks, author: N Katta, published on 2016.*
Title: The Spack package manager: bringing order to HPC software chaos, author: T Gamblin, published on 2015.*
Title: Measuring the impact of code dependencies on software architecture recovery techniques, author: T Lutellier, published on 2017.*
Apr. 15, 2019—U.S. Non-final Office Action—U.S. Appl. No. 15/846,749.
Aug. 28, 2019—U.S. Final Office Action—U.S. Appl. No. 15/846,749.
Jul. 29, 2020—U.S. Non-final Office Action—U.S. Appl. No. 15/846,749.
Feb. 17, 2021—U.S. Notice of Allowance—U.S. Appl. No. 15/846,749.
GA Di Lucca, et al., "Testing Web Applications," published 2002, IEEE, pp. 310-319.
Chandra, et al., "Intrusion recovery for database-backed web applications," published 2011, ACM org, pp. 101-114.
Yang, et al., "A framework for partitioning and execution of data stream applications in mobile cloud computing," Performance Evaluation Review, vol. 40, No. 4, Mar. 2013, pp. 23-32.

* cited by examiner

REMOTE COMPONENT LOADER

CROSS-REFERENCE TO RELATED APPLICATION(S)

This application is a division of U.S. patent application Ser. No. 15/846,749 filed Dec. 19, 2017, titled Remote Component Loader. That application is herein incorporated by reference for all purposes.

FIELD

Aspects of the disclosure relate to computer hardware and/or software. In particular, one or more aspects of the disclosure generally relate to computer hardware and software for the remote loading of application dependencies.

BACKGROUND

Internet applications and websites continue to increase with complexity and scope. Many applications are now provided as web applications, which use the ubiquity of web browsers and programming languages like JavaScript to perform a variety of tasks formerly relegated to operating system executables. However, current technology is ill-equipped to handle these web applications because they must be deployed as a single package, thereby requiring that developers re-compile and re-deploy applications for even the most minor of application modifications. There is therefore an ongoing need for improvements in the method in which web applications may be delivered and executed.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the disclosure provide technology that enhances the deployment of applications, such as web applications. Aspects of the disclosure address issues described above by disclosing methods, computer-readable media, software systems, and apparatuses for remotely loading application dependencies during runtime.

An application may have a plurality of dependencies. A dependency may be any amount of content, such as programming code. For example, the application may use a graphics library, and files containing graphics library code may comprise a dependency for the application. Application platforms like the Angular framework, developed by Google Inc. of Mountain View, Calif., often require that such dependencies be compiled along with the application into a single application package. Rather than compiling all such dependencies into the application package, the application may be compiled along with a remote dependency loader and information about which dependencies are needed by, but not packaged with, the application. Such information may be contained in an Asynchronous Module Definition ("AMD"), CommonJS, or Universal Module Definition ("UMD") specification. During runtime, the remote dependency loader may be configured to determine the absence of the dependencies and retrieve, from a remote server, the dependencies needed by the application. The retrieved dependencies may then be executed alongside the application.

The dependencies retrieved may be packaged for receipt by the remote loader. Each dependency may be packaged into a dependency module that may be retrieved by the remote loader. Such dependency modules need not contain sufficient information to execute independently. Dependency modules may contain some portions of code present in an application which may be discarded when executed alongside the application. Information about each dependency may be stored in a dependency server.

An illustration of the aforementioned features is provided herein. A game application may be configured using the Angular framework. The game application may have one or more dependencies, such as a 3D graphics module dependency and an audio module dependency. The game may use an AMD, CommonJS, or UMD specification to indicate the game application's dependencies. The game application may be packaged with fewer than all dependencies that it requires and a remote dependency loader. When the game is executed, the remote dependency loader may be configured to determine the absence of the dependencies. Depending on the nature of the dependencies, the application may pause (e.g. display a loading screen until the 3D graphics dependency is loaded) or may continue executing (e.g. allow a player to play a first game level because the dependency relates to a second game level). The remote dependency loader may query a dependency server to determine the location of the absent dependencies. The remote dependency loader may retrieve, from the dependency server, the absent dependencies. Each retrieved dependency may have its own AMD, CommonJS, or UMD specification, and each retrieved dependency may be configured based on properties of the computing device executing the application, the application, or the like. Using such AMD, CommonJS, or UMD specification, the remote dependency loader may modify a Hypertext Markup Language ("HTML") Document Object Model ("DOM") associated with the application to integrate the retrieved dependencies with the game application.

The details of these and other features are set forth in the accompanying drawings and the description below. Other features and advantages will be apparent from the description, drawings, and from the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying drawings in which like numerals indicate similar elements.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
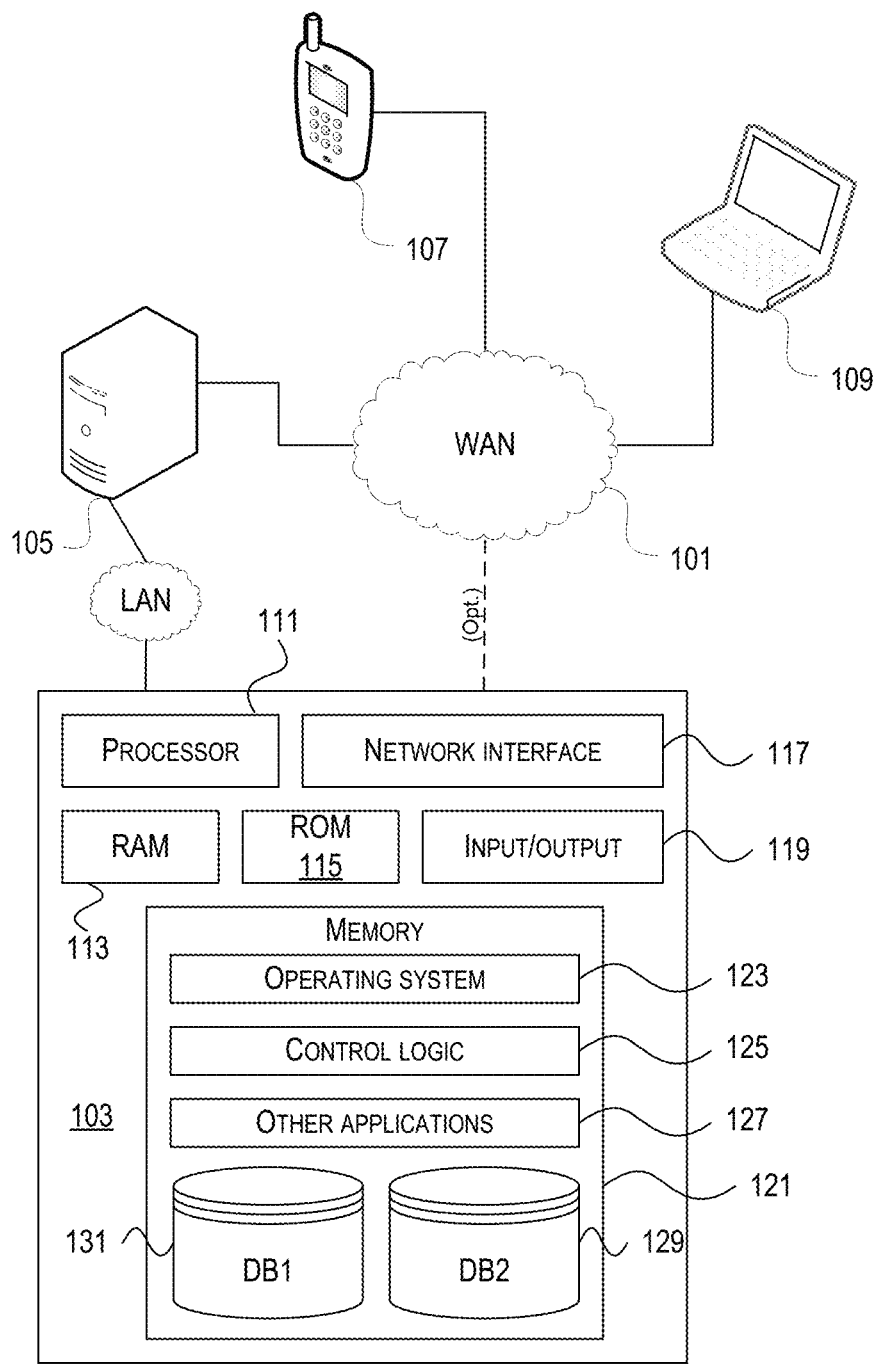
FIG. 1 depicts an illustrative computer system architecture that may be used in accordance with one or more illustrative aspects described herein.

FIG. 1 illustrates one example of a system architecture and data processing device that may be used to implement one or more illustrative aspects described herein in a stand-alone and/or networked environment. In accordance with the disclosure, computer software, hardware, and networks may be utilized in a variety of different system environments, including standalone, networked, remote-access (a/k/a remote desktop), virtualized, and/or cloud-based environments, among others. Various network nodes 103, 105, 107, and 109 may be interconnected via a wide area network ("WAN") 101, such as the Internet. Other networks may also or alternatively be used, including private intranets, corporate networks, local area networks ("LANs"), metropolitan area networks ("MAN") wireless networks, personal networks ("PAN"), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which may be comprised of the data—attributable to a single entity—residing across all physical networks.

The components may include data server 103, web server 105, and client computers 107, 109 (also referred to herein as "user device(s)"). Data server 103 may provide overall access, control and administration of databases and control software for performing one or more illustrative aspects describe herein. Data server 103 may be connected to web server 105, through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107, a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, for example, may include a processor 111 controlling overall operation of data server 103. Data server 103 may further include random access memory (RAM) 113, read only memory ("ROM") 115, network interface 117, input/output interfaces 119 (e.g., keyboard, mouse, display, printer, etc.), and memory 121. Input/output ("I/O") 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 131 and a second database 129. In some embodiments, the first database may include the second database (e.g., as a separate table, report, etc.). That is, the information may be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or Extensible Markup Language ("XML"). The computer-executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays ("FPGA"), and the like. Particular data structures may be used to more effectively implement one or more aspects described herein, and such data structures are contemplated within the scope of computer executable instructions and computer-usable data described herein.

Figure 2:
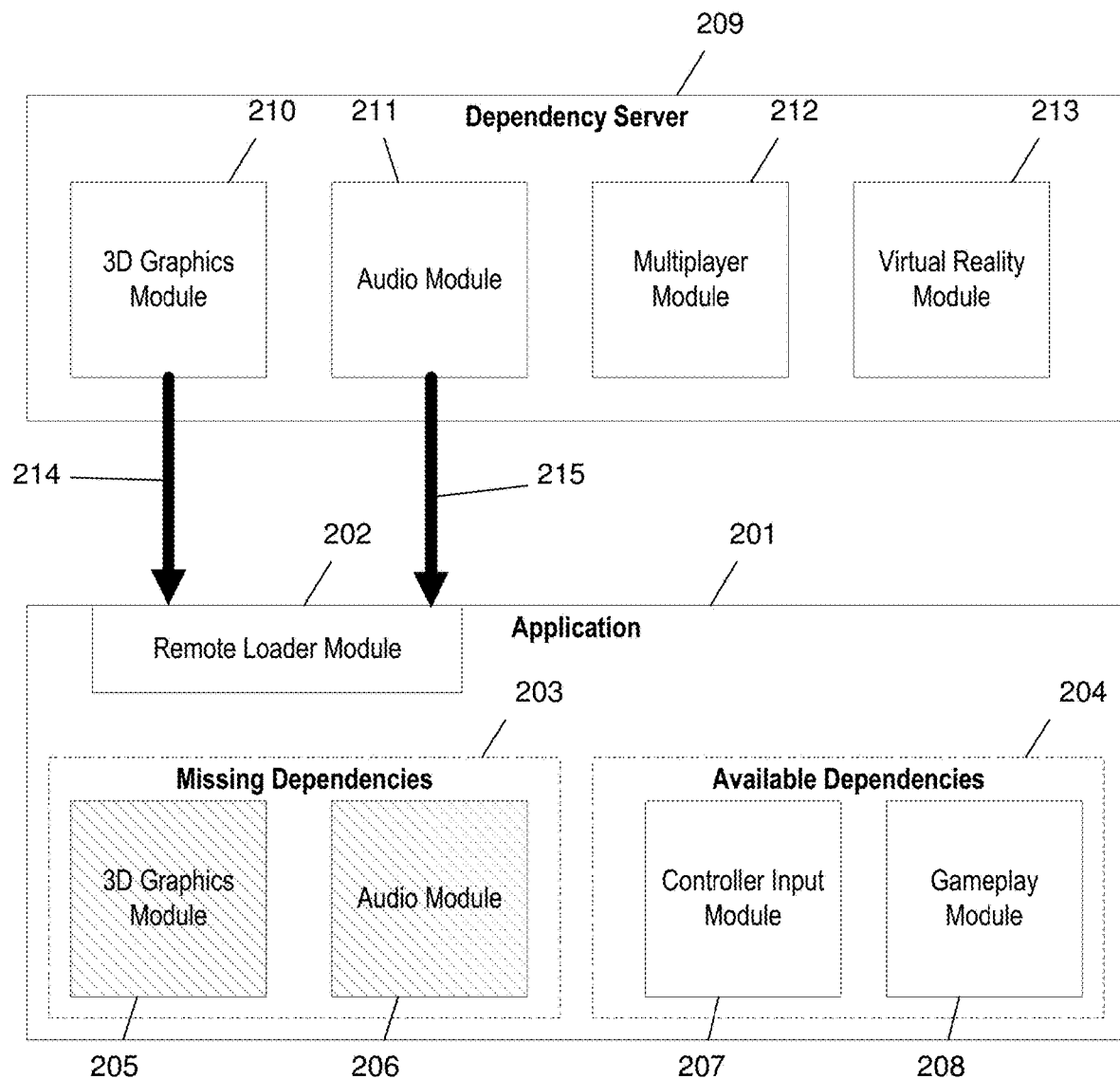
FIG. 2 illustrates dependencies in an application and how such dependencies may be retrieved from a dependency server.

FIG. 2 illustrates dependencies in an application and how such dependencies may be retrieved from a dependency server.

Application 201 may be any application executing on a computing device. Application 201 need not be an operating system application, such as an executable file. For example, application 201 may be a web application executing in a web browser through JavaScript. For illustrative purposes, and as depicted by the exemplary modules in FIG. 2, application 201 may be a game application.

Application 201 may be configured with one or more dependencies. Dependencies may comprise any portion of application 201 and need not be separate from application 201. For example, application 201 may be a single JavaScript file (e.g. a .js file) and each dependency may be a function or plurality of lines of code. As another example, dependencies may comprise secondary software modules comprising code and/or content (e.g. images for display). As depicted in FIG. 2, application 201 has a remote loader module 202 and a plurality of missing dependencies 203 and available dependencies 204. Specifically, as depicted in FIG. 2, the 3D graphics module 205 and audio module 206 are missing, whereas the controller input module 207 and gameplay module 208 are available. A dependency may be available to application 201 if it is local to application 201 in any manner: for example, available dependencies 204 may comprise modules compiled with or inside application 201.

Remote loader module 202 may be configured to identify and remedy missing dependencies 203. To identify missing dependencies 203, remote loader module 202 may be configured to analyze application 201. Application 201 may be configured with a listing of dependencies, including available and missing dependencies. Such a listing may comprise, for example, an AMD, CommonJS, or UMD specification. Additionally or alternatively, remote loader module 202 may be configured to handle exceptions or errors generated by game application 201 during runtime and determine whether such exceptions or errors relate to dependencies. Additionally or alternatively, remote loader module 202 may determine that a dependency compiled in application 201 is missing because a version already available to application 201 is malfunctioning or because a newer version of the dependency compiled in application 201 is available from dependency server 209. To remedy the missing dependencies 203, as indicated by arrows 214-215, remote loader module 202 may retrieve the missing dependencies (e.g. the 3D graphics module 210 and audio module 211) from dependency server 209. This process is detailed further with regards to FIG. 3, below.

Dependency server 209 may be one or more computing devices communicatively connected to application 201 which may store one or more dependencies 210-213. As depicted in FIG. 2, dependency server 209 stores a 3D graphics module 210, an audio module 211, a multiplayer module 212, and a virtual reality module 213 (these modules, located remotely from application 201, may be referred to collectively as remote dependency modules 210-213). Dependency server 209 may be communicatively connected to the computing device executing application 201. For example, application 201 may execute in a web browser on a personal computer, dependency server 209 may be located at a content delivery network, and application 201 may be configured to communicate with dependency server 209 over the Internet.

Dependency server 209 need not only store dependencies for application 201 but may store a wide variety of remote dependency modules 210-213. For example, application 201, depicted in FIG. 2 as a game application, does not have a virtual reality mode and thus never require virtual reality module 213; however, dependency server 209 may store virtual reality module 213 for other game applications. Remote dependency modules 210-213 stored by dependency server 209 may be configured for any context in which game application 201 may be run. For example, dependency server 209 may store a different version of 3D graphics module 210 for personal computers, video game consoles, and smartphones.

Dependency server 209 may be configured to create or modify dependencies based on requests from application 201. Dependency server 209 may be configured to, for example, compile dependencies on-the-fly based on requests from application 201. As described further below, this may enable dependency server 209 to watermark dependencies for security purposes. Dependency server may comprise a compiler or similar computer code enabling it to create or modify dependencies.

An illustrative description of FIG. 2 in the context of the Angular framework is described herein. Application 201 may be a game using the Angular framework. Application 201 may have been bundled into a single JavaScript UMD file with a controller input module 207, a gameplay module 208, and a remote loader module 202. Such bundling may have been performed using a JavaScript module bundler such as Webpack. Remote dependency modules 210-213 may have also been bundled and may comprise JavaScript UMD files. During this bundling process, and to conserve size and prevent redundant code, many required Angular framework dependencies may be omitted from remote dependency modules 210-213, and references to such required Angular framework dependencies may be listed in the externals property of the Webpack configuration file. A user may execute application 201 in their web browser. Application 201 may begin outputting into an HTML DOM displayed in the web browser. During runtime, the remote loader module 202 may identify that a 3D graphics module 205 and audio module 206 are needed but not present. The remote loader may receive from application 201, or from another program executing on the computing device executing application 201, an indication of capabilities of the computing device. The remote loader module 202 may transmit a request for 3D graphics module 210 and audio module 211 to dependency server 209. The request may comprise information about the capabilities of the computing device, the identity of the remote dependency modules 210-213 requested, and the like. Dependency server 209 may receive the request and authenticate the request. Dependency server 209 may analyze the capabilities of the computing device and determine the appropriate 3D graphics module 210 and audio module 211 to transmit to application 201. For example, 3D graphics module 210 may be a version of a 3D graphics module configured to be executed on a web browser, and audio module 211 may be a version of an audio module configured for the particular type of headphones connected to the computing device. If the modules do not exist, dependency server 209 may retrieve available code and compile a version based on the capabilities of the computing device. Dependency server may then transmit the 3D graphics module 210 and audio module 211 to application 201. Application 201, having received the 3D graphics module 210 and audio module 211, may modify the HTML DOM to add the 3D graphics module 210 and the audio module 211 by, for example, adding a "<script>" on-load listener.

Discussion will now turn to the flow of messages between a computing device executing an application and the dependency server.

Figure 3:
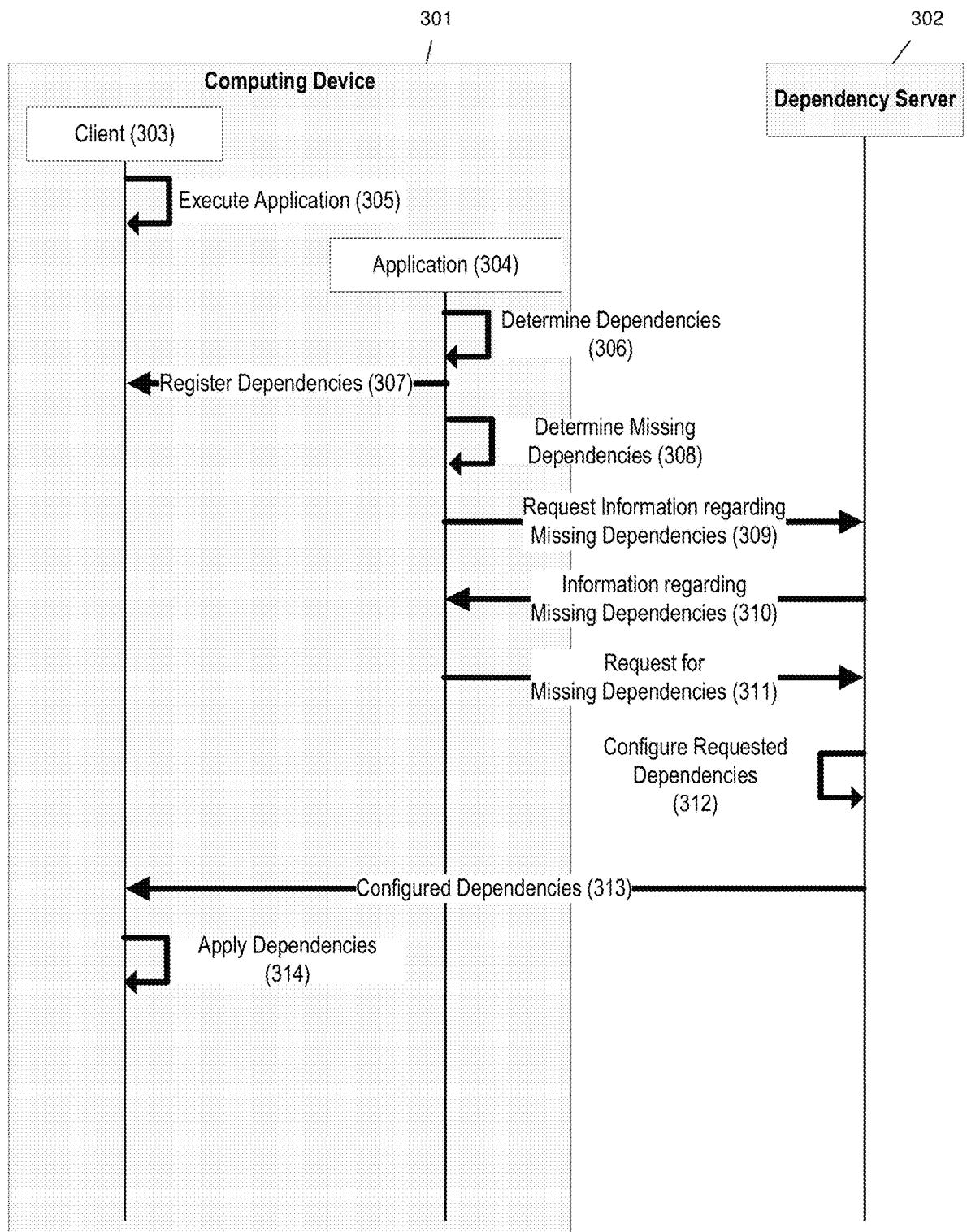
FIG. 3 is an illustrative message flow between a computing device executing a client and application and a dependency server.

FIG. 3 is an illustrative message flow diagram comprising messages which may be exchanged between a client 303 and an application 304 executing on a computing device 301 communicatively connected to dependency server 302. For illustrative purposes, client 303 may be a web browser, application 304 may be a web application (e.g. a single-page web application using HTML and JavaScript), and dependency server 302 may be a single computing device. As discussed above, dependency server 302 may be a plurality of computing devices, a content delivery network, or the like.

In step 305, client 303 executes application 304. Execution may include configuring an HTML DOM to display output of the application. Execution may be performed in any way appropriate based on the configuration of client 303 or application 304. For example, client 303 may be the WINDOWS operating system by Microsoft Corporation of Redmond, Wash., application 304 may be an executable file (e.g. an .exe file), and execution may be in accordance with the WINDOWS Portable Executable ("PE") format. As another example, computing device 301 may be a smartphone, client 303 may be an application wrapper, and application 304 may be an application specifically configured to run via the application wrapper. Execution may comprise causing display of output of application 304 in any manner. For example, output from application 304 may comprise output in an HTML DOM, a command line output, a video, or the like.

In step 306, application 304, executing on computing device 301, may determine one or more dependencies. A dependency so determined may be any content which may be used by application 304 during execution. For example, as also discussed in the context of FIG. 2, a dependency may comprise programming code, graphical or audio content, text content, or the like. A dependency for a web application may comprise a module which enables the web application to display animations, a particular spreadsheet format, or the like. A dependency for a game application may comprise a module of code which enables controller support, virtual reality support, or the like. Application 304 need not require the dependency to execute on computing device 301. For example, a game application may have a virtual really support dependency, but may be executed and played on a television screen and without virtual reality support.

In step 307, application 304 may register dependencies with client 303. Registration in this manner may comprise identifying dependencies such that they may be executed along with application 304. For example, client 303 may be a web browser, and registering dependencies may entail modifying the HTML DOM displayed in web browser 303 to add code which causes dependencies to execute with application 304. As another example, client 303 may be a wrapper application which, for security purposes, analyzes dependencies of applications executed using the wrapper application. Step 307 may entail changing the execution of application 304 such that, while client 303 may be unaware about dependencies, application 304, executing on client 303, is changed by virtue of the dependencies determined in step 306.

Step 307 may additionally or alternatively be performed by executing application 304 via client 303 based on with the dependencies determined in step 306. For instance, if application determines it has dependencies A, B, and C and that only dependencies A and B are available, application 304 may limit its own execution in view of the absence of dependency C. In this way, client 303 need not know about the dependencies of application 304, but application 304 may execute on client 303 based on such dependencies. For example, if application 304 is a game application with a 2D graphics module dependency and a 3D graphics module dependency and only the 2D graphics module is available, application 304 may only provide game functionality in 2D, and client 303 need not be instructed to initialize computing device graphics hardware.

Step 307 may additionally or alternatively include determining dependencies available at client 303. Client 303 may have access to one or more dependencies required by application 304. For example, a JQuery dependency may be missing from application 304, but may be stored by client 303 such that application 304 may retrieve, from client 303, the JQuery module.

In step 308, application 304 may determine missing dependencies. While, in step 306, application 304 may have determined that some dependencies are missing, the determination of missing dependencies in step 308 may be made in view of any dependencies available via client 303 or dependencies available elsewhere via computing device 301. For example, application 304 may require four dependencies: one may be available as compiled with application 304, one may be available at client 303, one may be stored in memory elsewhere on computing device 301, and one may be determined missing.

Application 304 may determine that a dependency is missing because it is not compiled with application 304. It may be preferable to not compile with application 304 a module that is frequently updated such that application 304 may use the latest version of the module without being recompiled. For example, an application developer may intentionally not compile with application 304 a regularly-updated JavaScript library (e.g. JQuery) and separately compile the latest version of the library such that, with every new version of the library, the developer need only compile the module corresponding to the library, rather than the entire application.

Application 304 may determine that a dependency is missing because, while the dependency may be available to application 304 on computing device 301, the version of the dependency on dependency server 302 is preferable. The version of the dependency available to application 304 may be corrupt, have errors, be older than a version available at dependency server 302, or the like. The version of the dependency available at application 304 may be older than a version of the dependency available via dependency server 302.

Application 304 may determine missing dependencies by analyzing a list of required dependencies and a list of available dependencies associated with application 304. Application 304 may analyze an AMD, CommonJS, or UMD specification associated with application 304 and determine one or more dependencies, including missing dependencies. This analysis may include predicting dependencies which may be required. For example, application 304 may have a dependency for a multiplayer module for a game application and determine, because the multiplayer module comprises online functionality, that a networking module is a dependency as well.

Application 304 may additionally or alternatively determine missing dependencies based on one or more errors generated by application 304. For instance, application 304 may determine an error has occurred, analyze the error, and determine that the error related to the absence of a dependency.

Application 304 may determine a missing dependency based on an analysis of a data associated with application 304 on computing device 301. Application 304 may, for instance, comprise a compiled application executable which may be analyzed to determine one or more deficiencies. Application 304 may be a compiled bundle of files which may be individually analyzed to determine the absence of files, functions, modules, or the like. This analysis may be preferable where a list of dependencies is unavailable to application 304.

Application 304 need not determine a specific dependency it lacks, but may merely determine that it is likely lacking a dependency. For example, application 304 may repeatedly determine an error has occurred and, based on the error, determine that there is a likelihood that a dependency is missing. In this manner, application 304 need not be compiled with code in order to analyze itself during execution, but may simply rely on the ability to request assistance from, for example, dependency server 302.

In step 309, application 304 may request information regarding the determined missing dependencies to dependency server 302. This request may be specific (e.g. "I need a 3D graphics module for a smartphone running a particular operating system") or may only indirectly relate to the missing dependency (e.g. "I keep getting error 302," "I don't understand this function call," or the like). The request may comprise a request for dependency metadata (e.g. the identity of a specific module name or identification number) or for the dependency itself.

In step 310, dependency server 302 may send web application 304 information regarding the missing dependencies. This information may be a response to the request in step 309 (e.g. providing a specific module Uniform Resource Locator ("URL") when asked in step 309). The information may be instructions which cause application 304 to retrieve the missing dependency. For example, dependency server 302 may transmit, to application 304, code which configures application 304 to be capable of retrieving a missing dependency.

Based on the information received from web application 304, dependency server 302 may instruct web application 304 to apply one or more limitations. This limitation may be removed when the dependency is provided to the web application 304 or to client 303, as explained later. For example, a game application may request a dependency related to a second level in a video game, and the dependency server may instruct the game application to prevent access to the second level until the dependency is retrieved. As another example, a web application may request a dependency related to advanced functionality, and the dependency server may instruct the web application to disallow access to the functionality (e.g. remove option from menus, gray out hypertext links, etc.) until the dependency is retrieved.

In step 311, application 304 may transmit to dependency server 302 a request for the missing dependencies. As application 304 may execute via client 303, the request may originate from client 303 via application 304. For instance, client 303 may be a web browser, and application 304 may modify the HTML DOM of the web browser by adding "<script>" tags which request, using the Hypertext Transfer Protocol ("HTTP"), the dependencies from URL(s) received in step 310. Application 304 may additionally or alternatively use any other protocol (e.g. File Transfer Protocol) to request the missing dependencies from dependency server 302. The request for the missing dependencies may comprise additional information about computing device 301, application 304, or client 303. For instance, where computing device 301 is a smartphone, client 303 is a web browser, and application 304 is a game application, application 304 may request a 3D graphics module in a format and standard that may execute on the computing device and the web browser.

In step 312, dependency server 302 may configure the requested dependencies. Configuration of the missing dependencies may comprise compiling and/or formatting the dependencies based on the capabilities of computing device 301, application 304, or client 303. For instance, dependency server 302 may compile modules on-the-fly such that the latest version of code is available to application 304. As another illustration, dependency server 302 may apply a watermark to the requested dependencies such that the requested dependencies may be associated with computing device 301, application 304, client 303, the user of computing device 301, or the like.

The requested dependencies configured in step 312 need not have the same format as application 304. Application 304 may be packaged in a first format and the requested dependencies may be packaged in a different format. For example, application 304 may be packaged in a format which allows application 304 to execute via client 303, whereas the dependencies configured in step 312 may be packaged in a second format which cannot be executed alone via client 303.

In step 313, dependency server 302 may transmit, to either or both application 304 and/or client 303, the configured dependencies. As illustrated in FIG. 3, in some circumstances, dependency server 302 may send the dependencies directly to client 303. For example, if client 303 is a web browser and if application 304 requests dependencies in step 311 by configuring the web browser with a "<script>" HTML tag such that the browser is caused to request the dependency via HTTP, dependency server 302 would be caused to send the dependencies to the web browser.

An example of steps 311, 312, and 313 is provided herein for the reader. Computing device 301 may be a personal computer, client 303 may be a web browser, and application 304 may be a secure chat application. The developer of the secure chat application may have not compiled with the application a module which enables encrypted transmission of text chat. In step 311, the secure chat application may request, from the dependency server, a module which enables the encrypted transmission of text chat. In response, dependency server 302 may compile a module which enables the encrypted transmission of text chat along with a digital signature associating the module with application 304, client 303, computing device 301, one or more timestamps, the account associated with the user of computing device 301, and the like. Dependency server 302 may then transmit the compiled module to the web browser. In this manner, dependency server 302 may authenticate application 304 or provide a method in which other computing devices may authenticate application 304.

In step 314, the dependencies may be applied to application 304. The application of the dependencies to application 304 may depend on the nature of the dependencies. For instance, of the dependencies are standalone JavaScript files using the Angular framework, they may simply be executed using a web browser along with application 304. Applying the dependencies may involve similar processes or steps taken when dependencies were registered in step 307. For example, an HTML DOM may be modified.

One or more aspects of the disclosure may be embodied in a computer-usable media and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays ("FPGA"), and the like. Particular data structures may be used to more effectively implement one or more aspects of the disclosure, and such data structures are contemplated within the scope of computer executable instructions and computer-usable data described herein.

Aspects of the disclosure have been described in terms of examples. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned examples may be utilized alone or in combination or subcombination with elements of the other examples. For example, any of the above described systems and methods or parts thereof may be combined with the other methods and systems or parts thereof described above. For example, the steps shown in the figures may be performed in other than the recited order, and one or more steps shown may be optional in accordance with aspects of the disclosure. It will also be appreciated and understood that modifications may be made without departing from the true spirit and scope of the present disclosure. The description is thus to be regarded as illustrative instead of restrictive on the present disclosure.

We claim:

1. A method comprising:
   generating a first package comprising a web application, wherein the first package does not contain one or more secondary software modules of the web application, and wherein the one or more secondary software modules provide the web application additional functionality not provided without the one or more secondary software modules;
   sending the first package to a computing device, wherein the computing device is configured to execute the web application;
   receiving, from the computing device and during execution of the web application by the computing device, a request for the one or more secondary software modules, wherein the request for the one or more secondary software modules comprises:
      an indication of capabilities of the computing device,
      an indication of a first version of the one or more secondary software modules available at the computing device, and
      an indication of one or more missing required modules on which the first package is dependent;
   generating, based on the capabilities of the computing device, a second package comprising a second version of the one or more secondary software modules, wherein the second package comprises the one or more missing required modules on which the first package is dependent; and
   sending the second package to the computing device.

2. The method of claim 1, wherein the request for the one or more secondary software modules comprises an indication of an error message associated with the one or more secondary software modules.

3. The method of claim 1, wherein the second package further comprises a digital watermark.

4. The method of claim 1, wherein the first package is generated based on a first format, and wherein the second package is generated based on a second format.

5. The method of claim 1, wherein the computing device is configured to execute the one or more secondary software modules and the web application simultaneously.

6. The method of claim 1, wherein the request identifies the web application.

7. An apparatus comprising:
   one or more processors; and
   memory storing instructions that, when executed by the one or more processors, cause the apparatus to:
      generate a first package comprising a web application, wherein the first package does not contain one or more secondary software modules of the web application, and wherein the one or more secondary software modules provide the web application additional functionality not provided without the one or more secondary software modules;
      send the first package to a computing device, wherein the computing device is configured to execute the web application;
      receive, from the computing device and during execution of the web application by the computing device, a request for the one or more secondary software modules, wherein the request for the one or more secondary software modules comprises:
         an indication of capabilities of the computing device,
         an indication of a first version of the one or more secondary software modules available at the computing device, and
         an indication of one or more missing required modules on which the first package is dependent;
      generate, based on the capabilities of the computing device, a second package comprising a second version of the one or more secondary software modules, wherein the second package comprises the one or more missing required modules on which the first package is dependent; and send the second package to the computing device.

8. The apparatus of claim 7, wherein the request for the one or more secondary software modules comprises an indication of an error message associated with the one or more secondary software modules.

9. The apparatus of claim 7, wherein the second package further comprises a digital watermark.

10. The apparatus of claim 7, wherein the first package is generated based on a first format, and wherein the second package is generated based on a second format.

11. The apparatus of claim 7, wherein the computing device is configured to execute the one or more secondary software modules and the web application simultaneously.

12. The apparatus of claim 7, wherein the request identifies the web application.

13. One or more non-transitory computer-readable media storing instructions that, when executed, cause performance of steps comprising:

generating a first package comprising a web application, wherein the first package does not contain one or more secondary software modules of the web application, and wherein the one or more secondary software modules provide the web application additional functionality not provided without the one or more secondary software modules;

sending the first package to a computing device, wherein the computing device is configured to execute the web application;

receiving, from the computing device and during execution of the web application by the computing device, a request for the one or more secondary software modules, wherein the request for the one or more secondary software modules comprises:

an indication of capabilities of the computing device, an indication of a first version of the one or more secondary software modules available at the computing device, and an indication of one or more missing required modules on which the first package is dependent;

generating, based on the capabilities of the computing device, a second package comprising a second version of the one or more secondary software modules, wherein the second package comprises the one or more missing required modules on which the first package is dependent; and sending the second package to the computing device.

14. The non-transitory computer-readable media of claim 13, wherein the request for the one or more secondary software modules comprises an indication of an error message associated with the one or more secondary software modules.

15. The non-transitory computer-readable media of claim 13, wherein the second package further comprises a digital watermark.

16. The non-transitory computer-readable media of claim 13, wherein the first package is generated based on a first format, and wherein the second package is generated based on a second format.

17. The non-transitory computer-readable media of claim 13, wherein the computing device is configured to execute the one or more secondary software modules and the web application simultaneously.

\* \* \* \* \*